CHARACTER GROUP RECOGNITION SYSTEM

Filed April 12, 1956 11 Sheets-Sheet 1

INVENTORS
RUSSELL A. ROWLEY
FRANCIS V. ADAMS
JOHN F. GAFFNEY

BY Albert R. Hodges
ATTORNEY

CHARACTER GROUP RECOGNITION SYSTEM

INVENTORS
RUSSELL A. ROWLEY
FRANCIS V. ADAMS
JOHN F. GAFFNEY
BY
Albert R. Hodges
ATTORNEY

CHARACTER GROUP RECOGNITION SYSTEM

Filed April 12, 1956 11 Sheets-Sheet 3

A=ADVANCE SIGNAL (5-6)
C=CHOPPER SIGNAL (5-6)

INVENTORS
RUSSELL A. ROWLEY
FRANCIS V. ADAMS
JOHN F. GAFFNEY
BY Albert R. Hodges
ATTORNEY INVENTORS
RUSSELL A. ROWLEY
FRANCIS V. ADAMS
JOHN F. GAFFNEY
BY Albert R. Hodges
ATTORNEY

CHARACTER GROUP RECOGNITION SYSTEM

Filed April 12, 1956

11 Sheets-Sheet 5

INVENTORS
RUSSELL A. ROWLEY
FRANCIS V. ADAMS
JOHN F. GAFFNEY

BY Albert R. Hodges
ATTORNEY

INVENTORS
RUSSELL A. ROWLEY
FRANCIS V. ADAMS
JOHN F. GAFFNEY

BY Albert R. Hodges
ATTORNEY

July 24, 1962 R. A. ROWLEY ET AL 3,046,527

CHARACTER GROUP RECOGNITION SYSTEM

Filed April 12, 1956 11 Sheets-Sheet 7

INVENTORS
RUSSELL A. ROWLEY
FRANCIS V. ADAMS
JOHN F. GAFFNEY

BY Albert R. Hodges
ATTORNEY

INVENTORS
RUSSELL A. ROWLEY
FRANCIS V. ADAMS
JOHN F. GAFFNEY
BY
Albert R. Hodges
ATTORNEY

CHARACTER GROUP RECOGNITION SYSTEM

Filed April 12, 1956 11 Sheets-Sheet 9

*INVENTORS*
RUSSELL A. ROWLEY
FRANCIS V. ADAMS
JOHN F. GAFFNEY
*BY*
Albert R. Hodges
ATTORNEY

CHARACTER GROUP RECOGNITION SYSTEM

Filed April 12, 1956 11 Sheets-Sheet 10

*INVENTORS*
RUSSELL A. ROWLEY
FRANCIS V. ADAMS
JOHN F. GAFFNEY

*BY* Albert R. Hodges
ATTORNEY

July 24, 1962 R. A. ROWLEY ET AL 3,046,527

CHARACTER GROUP RECOGNITION SYSTEM

Filed April 12, 1956 11 Sheets-Sheet 11

INVENTORS
RUSSELL A. ROWLEY
FRANCIS V. ADAMS
JOHN F. GAFFNEY

BY

Albert R. Hodges

ATTORNEY

United States Patent Office 3,046,527

Patented July 24, 1962

3,046,527

CHARACTER GROUP RECOGNITION SYSTEM

Russell A. Rowley, Binghamton, and Francis V. Adams and John F. Gaffney, Endicott, N.Y., assignors to International Business Machines Corporation, New York, N.Y., a corporation of New York Filed Apr. 12, 1956, Ser. No. 577,876
10 Claims. (Cl. 340—167)

This invention relates to systems for recognizing or detecting a plurality of predetermined sequences of information items or characters, and more particularly to arrangements adapted to recognize a large number of different groups of characters, these groups being either of equal lengths or of varying lengths and being overlapping or non-overlapping.

A principal object of the present invention is to provide an improved system for recognizing a plurality of predetermined sequences of information items or characters.

Another object is to provide a system adapted to receive information character by character and to recognize groups of such characters of various lengths and either overlapping or non-overlapping.

Still another object of the present invention is to provide a system for recognizing predetermined sequences of information items and for weighting certain sequences according to predetermined values to provide weight output signals.

A further object is to provide a system which recognizes and assigns weights to predetermined sequences of information items, and also develops a category signal when the resultant weight output signals appear in a predetermined sequence.

Still another object of the present invention is to provide a system for recognizing predetermined sequences of information items and for weighting certain sequences according to predetermined values to provide weight output signals, an arrangement also being provided to suppress all simultaneously occurring weight output signals except the one signifying most significant weight.

In accordance with the present invention, there is provided a system for recognizing a plurality of predetermined sequences of information items which comprises a number of structural elements. These elements include multi-position register means for receiving the information item by item, means for periodically advancing each information item from position to position through the register means, plural comparing means associated respectively with different positions in the register means for detecting certain sequences of information, and means for weighting these certain sequences according to predetermined values to provide weight output signals.

In accordance with another feature of the present invention, there are provided means which are adapted to receive the weight output signals and to suppress all simultaneously occurring such signals except the one indicating the most significant weight.

In accordance with an additional feature of the present invention, means are also provided for developing a category signal when the weight output signals occur in a predetermined sequence. The latter means may be utilized whether or not the above-mentioned weight suppression means are also being utilized.

Other objects and features of the present invention will be pointed out in the following description and claims and illustrated in the accompanying drawings, which disclose, by way of example, the principle of the invention and the best mode, which has been contemplated, of applying that principle.

In the drawings, in which like reference numerals designate like components:

Figure 1:
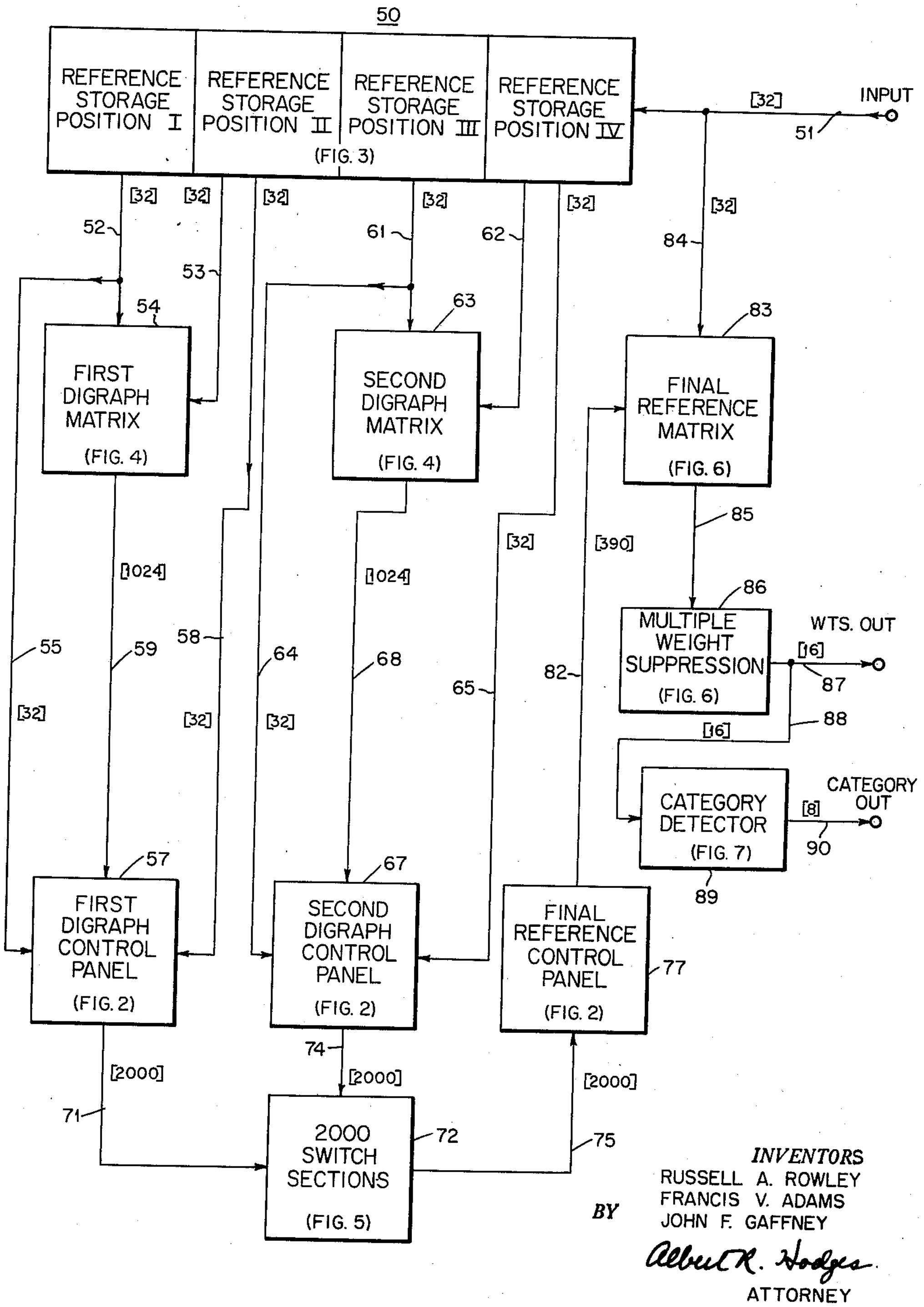
FIG. 1 is a block diagram of a character sequence recognition system in accordance with the present invention.

Throughout the drawings, numerals in brackets are employed to designate the number of separate lines in connecting cables shown in the drawings as a single line to avoid unnecessary complexity. In FIGS. 3–7 the encircled reference numerals are utilized to designate the correspondingly marked terminals on the circuit components illustrated in FIGS. 9–26, the pertinent component figures being indicated in FIGS. 3–7 by figure numbers in parentheses within each block.

The system of the present invention will be better understood if a specific embodiment is shown and described. In the embodiment here shown and described by way of example, the input comprises 32 lines, each character or information item being indicated by a positive-going signal pulse appearing on one, and one only, of these lines at any given time. The input information items are thus supplied serially, character by character. Each character time is divided into eight bits. The input signal is present from 6-bit time of one character until 5-bit time of the following character. The character time is 66⅔ microseconds and the bit time is 8⅓ microseconds.

Provision is made for predetermining 2000 separate groups, each comprising from two to five characters, for comparison with the incoming information. The output comprises 16 different weight values, which may be selectively assigned to desired character groups; and 8 different category signals, a category signal being developed whenever an odd weight signal is immediately followed by the next higher even weight signal. If desired, all simultaneously occurring weight signals except the highest-valued one may be suppressed.

*The System as a Whole*

Figure 2:
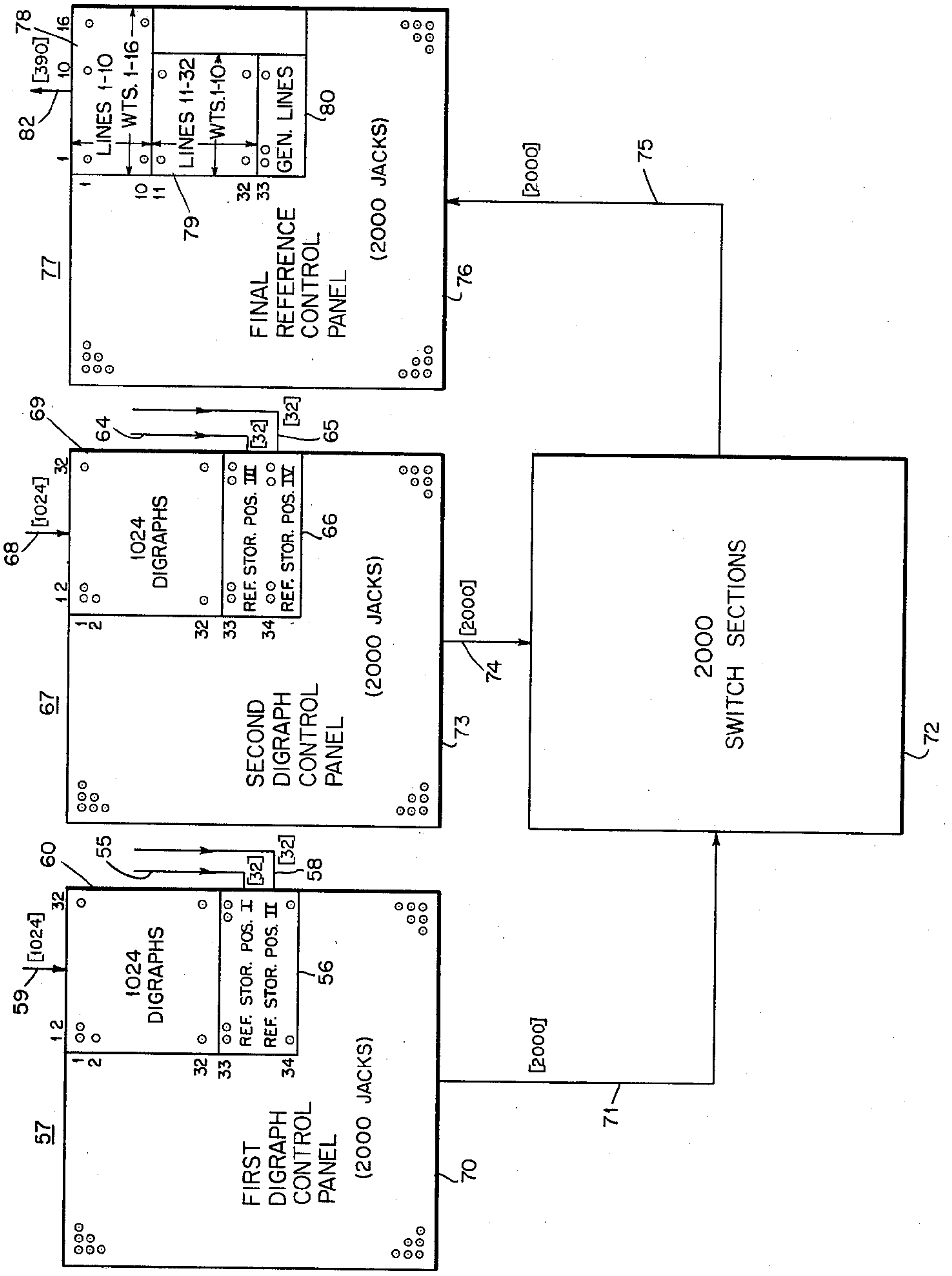
FIG. 2 is a block diagram showing in somewhat greater detail the portions of FIG. 1 representing the control panels and the switch unit of the system of the present invention.

FIGS. 1 and 2 of the drawings illustrate, in block form, a character sequence recognition system in accordance with the present invention. Reference storage unit 50 comprises 32 shifting registers each having four position numbered I–IV to correspond with the position the stored character assumes in the pentagraph being assembled. Each register position may comprise a bistable trigger circuit having OFF and ON conditions. All the trigger circuits are normally in their OFF condition. Input cable 51 comprises 32 input lines, one going to the input of each shifting register. A signal is present on only one of these lines at a time, and this signal is stepped or advanced progressively through the corresponding register, beginning with position IV and ending with position I. The presence of a signal in any position of a register causes that position to assume its ON condition and thus to produce an output signal. After a signal advances from a given position to the next succeeding position, the first position returns to its normally OFF condition. After four operating cycles have occurred, the first input signal, which for convenience may be designated character A, occupies position I; the second input signal or character B occupies position II; the third and fourth input signals, C and D, occupy respectively positions III and IV; and the fifth or E character is present on one of the input lines comprising cable 51.

Characters A and B are now supplied, respectively, through cables 52 and 53 each comprising 32 lines, to first digraph matrix unit 54. Unit 54 comprises 1024 cathode followers arranged in 32 columns and 32 rows. The grids of these cathode followers are driven respectively by the 32 lines comprising cable 52 representing the output of reference storage position I, and the plates of the cathode followers are driven respectively by the 32 lines comprising output cable 53 of storage position II. The output of storage position I is also supplied by means of a 32-line cable 55 to 32 jacks comprising row 33 of portion 56 of first digraph control panel 57. Likewise, the output of storage position II is also supplied through a 32-line cable 58 to the 32 jacks comprising row 34 of portion 56 of panel 57.

First digraph matrix unit 54 combines the signals received from reference storage positions I and II and sends a resultant signal over one of the 1024 lines comprising cable 59, these lines being connected respectively to 1024 jacks, arranged in 32 columns and 32 rows, in portion 60 of first digraph control panel 57.

In a similar manner, the outputs of storage positions III and IV are supplied through individual 32-line cables 61 and 62 respectively to the grids and to the plates of the 1024 cathode followers comprising second digraph matrix 63. The outputs of storage positions III and IV are also connected, by means of 32-line cables 64 and 65, respectively, to 32 jacks comprising row 33 and to 32 jacks comprising row 34 of portion 66 of second digraph control panel 67. The 1024 outputs of second digraph matrix 63, representing the result of combining characters C and D, are supplied through a 1024-line cable 68 respectively to 1024 jacks, arranged in 32 columns and 32 rows, comprising portion 69 of second digraph control panel 67.

Portion 70 of first digraph control panel 57 comprises 2000 jacks each connected by an individual line in cable 71 to the No. 3 grid of one of the 2000 pentode switching tubes comprising switching unit 72. Likewise, the 2000 jacks comprising portion 73 of second digraph control panel 57 are connected by means of a 2000-line cable 74 respectively to the No. 1 grids of the 2000 pentode switching tubes comprising unit 72.

The plates of the 2000 switching tubes of unit 72 are connected by means of a 2000-line cable 75 respectively to 2000 jacks comprising portion 76 of final reference control panel 77. It will be understood that the jacks in portions 70, 73 and 76 of control panels 57, 67 and 77 associated with any given switching tube of unit 72 are located in the same relative positions on all three control panels.

Portion 78 of final reference control panel 77 comprises 160 jacks arranged in 16 columns corresponding with weights 1–16 and 10 rows corresponding with lines 1–10. Portion 79 of final reference control panel 77 comprises 220 jacks arranged in 10 columns corresponding with weights 1–10 and 22 rows corresponding with lines 11–32. Row 33 comprises 10 jacks constituting constituting portion 80. These are used to assign a desired weight between 1 and 10 when the final character is unspecified.

The 390 lines connected respectively to the jacks comprising portions 78, 79 and 80 of final reference control panel 77 form a cable 82 which serves as one input for final reference matrix 83. The other input for this matrix comprises the 32 lines of cable 84, connected respectively to the 32 input lines comprising input cable 51. The output of final reference matrix 83 is supplied by means of a cable 85 to multiple weight suppression unit 86. The output of unit 86 is developed on one or more of the 16 weight lines comprising cable 87. The 16 outputs of unit 86 are also supplied, by cable 88, to category detector unit 89, the output of which comprises a cable 90 having 8 category lines.

Five-character groups or pentagraphs are entered into the system for comparison with the incoming information items or characters by suitable plug wiring of control panels 57, 67 and 77. When the first two characters of the pentagraph are specified, the desired output of first digraph matrix 54 is chosen by inserting one end of a plug wire into the appropriate jack of portion 60 of first digraph control panel 57. The first character determines the column and the second character determines the row of the selected jack of portion 60. If the first character of the pentagraph is unspecified, resulting in a group called a tetragraph, the output of storage position II is utilized directly by plugging the plug wire into one of the 32 jacks comprising row 34 of portion 56 of control panel 57. If the second character of the pentagraph is unspecified, the output of storage position I is utilized directly by plugging the plug wire into one of the 32 jacks comprising row 33 of portion 56 of control panel 57. The other end of this plug wire is inserted in any unused one of the 2000 jacks comprising portion 70 of control panel 57. If both the first and second characters are unspecified, so that the character group of interest is a trigraph, first digraph control panel 57 is not wired at all.

The third and fourth characters of the pentagraph are entered by appropriate wiring of second digraph control panel 67. If both the third and fourth characters are specified, the appropriate jack of portion 69 of control panel 67 is wired to the jack of portion 73 which corresponds with the switch of unit 72 in which the first two characters have already been entered. If the third character is unspecified, the output of storage position IV is utilized directly by plugging the plug wire into the appropriate jack of row 34 in portion 66 of control panel 67. If the first, second and third characters of the pentagraph are unspecified, the remaining two characters are entered as a digraph. If the fourth character of the pentagraph is unspecified, the output of storage position III is utilized directly by plugging the plug wire into the appropriate jack of row 33 in portion 66 of control panel 67.

When both inputs to a given switch of unit 72 are signaled simultaneously or when the input from second digraph control panel 67 is signalled while the input from first digraph control panel 57 is unplugged, the switch will complete a circuit to the corresponding jack in portion 76 of final reference control panel 77. This jack is connected by means of a plug wire to a jack in one of the portions 78, 79 and 80 of control panel 77. The row into which this plug wire is plugged determines the fifth character of the pentagraph being entered, and the column into which this plug wire is plugged determines the weight assignment of the pentagraph. If unspecified, the pentagraph may be assigned the desired weight by plugging the plug wire into the appropriate jack of row 33 in portion 80 of control panel 77.

The information thus entered into one of portions 78, 79, 80 of control panel 77 is supplied to final reference matrix 83 in which it is combined with the information supplied by cable 84 and representing the fifth character of the pentagraph. Thus it will be apparent that the information sent to final reference matrix 83 from final reference control panel 77 serves to establish that the first four characters of the predetermined pentagraph are present in reference storage unit 50 (FIG. 1). If at this time the final character of the predetermined pentagraph is present on input cable 84, a signal identifying the weight classification of this pentagraph is produced.

The resultant weight signals, carried by cable 85, pass through weight suppression unit 86 and appear upon the 16 weight output lines comprising cable 87. If unit 86 is optionally actuated, only the highest weight signal will appear at cable 87 when more than one weight is signalled simultaneously, a condition encountered frequently when the control panels have been plugged so that the system is capable of recognizing a number of different incoming character groups.

Otherwise, all the weight outputs are supplied by cable 87. The weight outputs from unit 86 are also supplied by means of cable 88 to category detector unit 89, this unit serving to monitor these weight signals and to produce category signals whenever each odd-valued weight signal is immediately followed by the next succeeding even-valued weight signal. The eight category weight signals appear on the eight lines comprising category 90.

*The Reference Storage Unit*

Reference storage unit 50 of FIG. 1 comprises 32 four-position shifting registers, one register being associated with each of the 32 input lines of cable 51. Since all of the shifting registers operate in a similar manner, differing only by the input line with which they are associated and by the information they receive, only the shifting register associated with input line 1 will be described.

Figure 3:
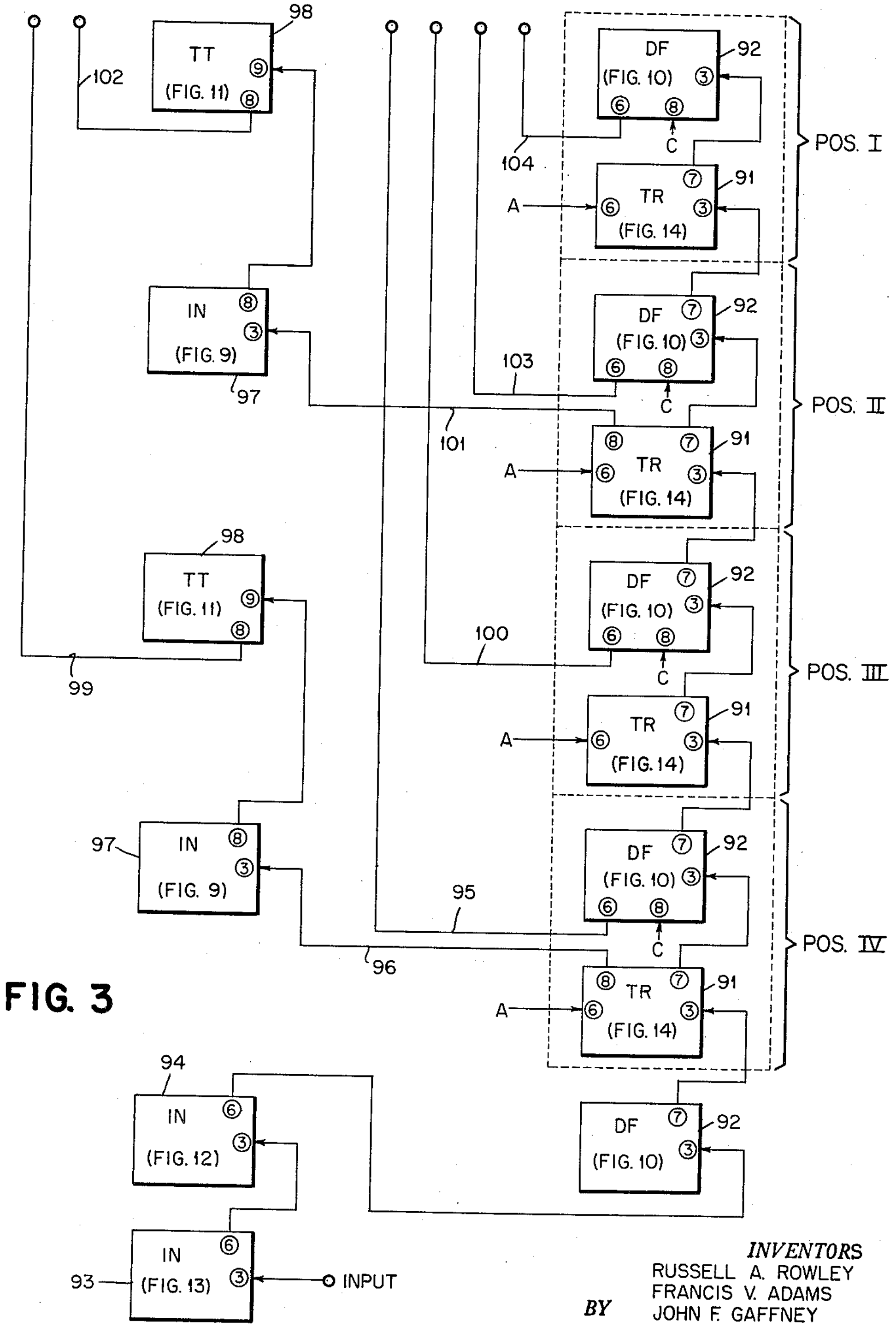
FIG. 3 is a block diagram of a single one of the reference storage registers depicted in FIG. 1.

Referring now to FIG. 3 of the drawings, there is shown a block diagram of a single reference storage register having four positions, respectively designated I, II, III and IV. Each position comprises a bistable trigger unit 91 (FIG. 14) and a unit 92 (FIG. 10) comprising a cathode follower and a pulse generator. Advance signals extending from five-bit time to six-bit time from a suitable source (not shown) are applied to terminal 6 of each of units 91. Chopper signals, also extending from five-bit time to six-bit time, supplied by a suitable source (not shown) are applied to terminal 8 of each of the four units 92 associated respectively with the four positions of the register.

Figure 12:
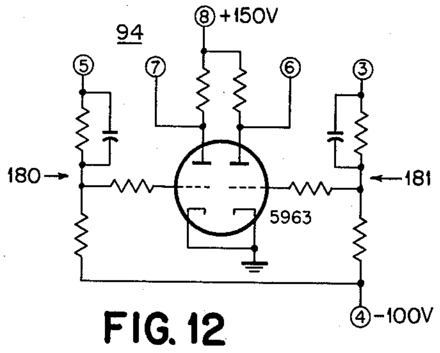
Figure 13:
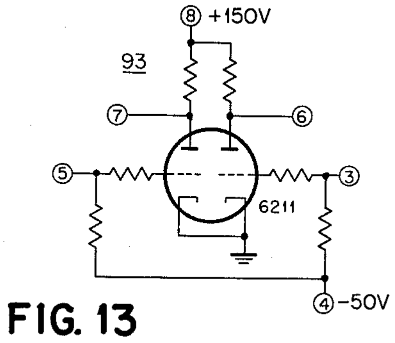

Input line 1 of input cable 51 (FIG. 1) is connected to terminal 3 of an inverter unit 93 (FIG. 13). Terminal 6 of unit 93 is connected to terminal 3 of an inverter unit 94 (FIG. 12), terminal 6 of which is connected to terminal 3 of an additional unit 92.

The input signal on line 1 starts between six-bit time of one character and two-bit time of the following character and terminates at five-bit time. This input signal, which varies between −20 volts and +30 volts, is transformed to a suitable voltage level by inverter units 93 and 94. Unit 92, to which the transformed input signal is supplied, contains a pulse generator and a cathode follower. The trailing edge of the input signal causes the normally conducting triode of the pulse generator portion of unit 92 to cut off. After approximately eight microseconds or one-bit time, the capacitor in the differentiating circuit charges sufficiently so that the triode again becomes conductive. When conduction is thus resumed, a signal is sent through this unit to turn ON trigger unit 91 of position IV. Trigger unit 91 is turned OFF by an advance signal which occurs from five-bit to six-bit time.

When trigger unit 91 is turned OFF by the advance signal, the trailing edge of the resultant output signal appearing at terminal 7 of unit 91 cuts off the normally conducting triode in the associated differentiating unit 92. When this differentiator resumes conduction, a signal is sent to trigger unit 91 in position III, causing it to be turned ON. This process is repeated each time an advance signal is received until the information runs out of the end of the register after it is stepped out of position I. It is possible for any combination of the positions of the register to contain information at the same time, that is, for the corresponding trigger circuits to be in their ON condition, depending upon the sequence of signals on input line 1 in four successive operating intervals.

The output of each register position is developed by a cathode follower in each unit 92. The output signal is chopped by the chopper signal applied to terminal 8 of each of these units, so that the trailing edge of the output signal, developed respectively at terminal 7 of these units, has a shape which is substantially unaffected by the capacitance of the output circuits.

Figure 9:
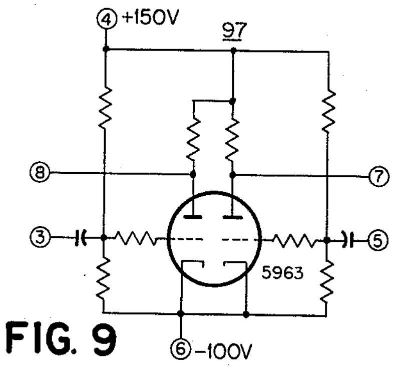
FIGS. 9–26 are schematic circuit diagrams of various components illustrated in block form in one or more of FIGS. 3–7.

The cathode follower in the unit 92 of position IV develops a positive signal (−45 volts to +10 volts) at terminal 6 of this unit, and this signal is supplied by a line 95, included in cables 52 and 55 (FIG. 1), to the first jack in row 34 of portion 66 of second digraph control panel 67 (FIG. 2). The negative output of trigger unit 91 in position IV is developed at terminal 8 and supplied by a line 96 to terminal 3 of an inverter unit 97 (FIG. 9). The output of unit 97 is passed through a cathode follower unit 98 (FIG. 11) and then is connected by a line 99, included in cable 62, to the plates in the first row of 32 cathode followers in second digraph matrix 63 (FIG. 1).

The output signals developed at terminal 6 of unit 92 in position III are supplied by a line 100, included in cable 61, to the first jack of row 33 in portion 66 of second digraph control panel 67 (FIG. 2), and also to the first column of 32 grids in second digraph matrix 63 (FIG. 1).

The negative output signals appearing at terminal 8 of trigger unit 91 in position II are supplied by a line 101 through an inverter unit 97 and a cathode follower unit 98 to a line 102, included in cable 53, serving as a drive for the plates in the first row of 32 cathode followers in first digraph matrix 54 (FIG. 1).

The output signals appearing at terminal 6 of unit 92 in position II are supplied by a line 103, included in cable 58, to the first jack of row 34 of portion 56 of first digraph control panel 57 (FIG. 2).

The output appearing at terminal 6 of unit 92 in position I is supplied by a line 104, included in cable 55, to the first jack of row 33 of portion 56 of first digraph control panel 57 (FIG. 2), and to the grids in the first column of 32 cathode followers in first digraph matrix 54 (FIG. 1).

*The Digraph Matrices*

The first and second digraph matrices (units 54 and 63 in FIG. 1) are identical in design and mode of operation. For convenience in relating it to the other units of the system, first digraph matrix 54 is shown in FIG. 4 of the drawings and will now be described.

Figure 4:
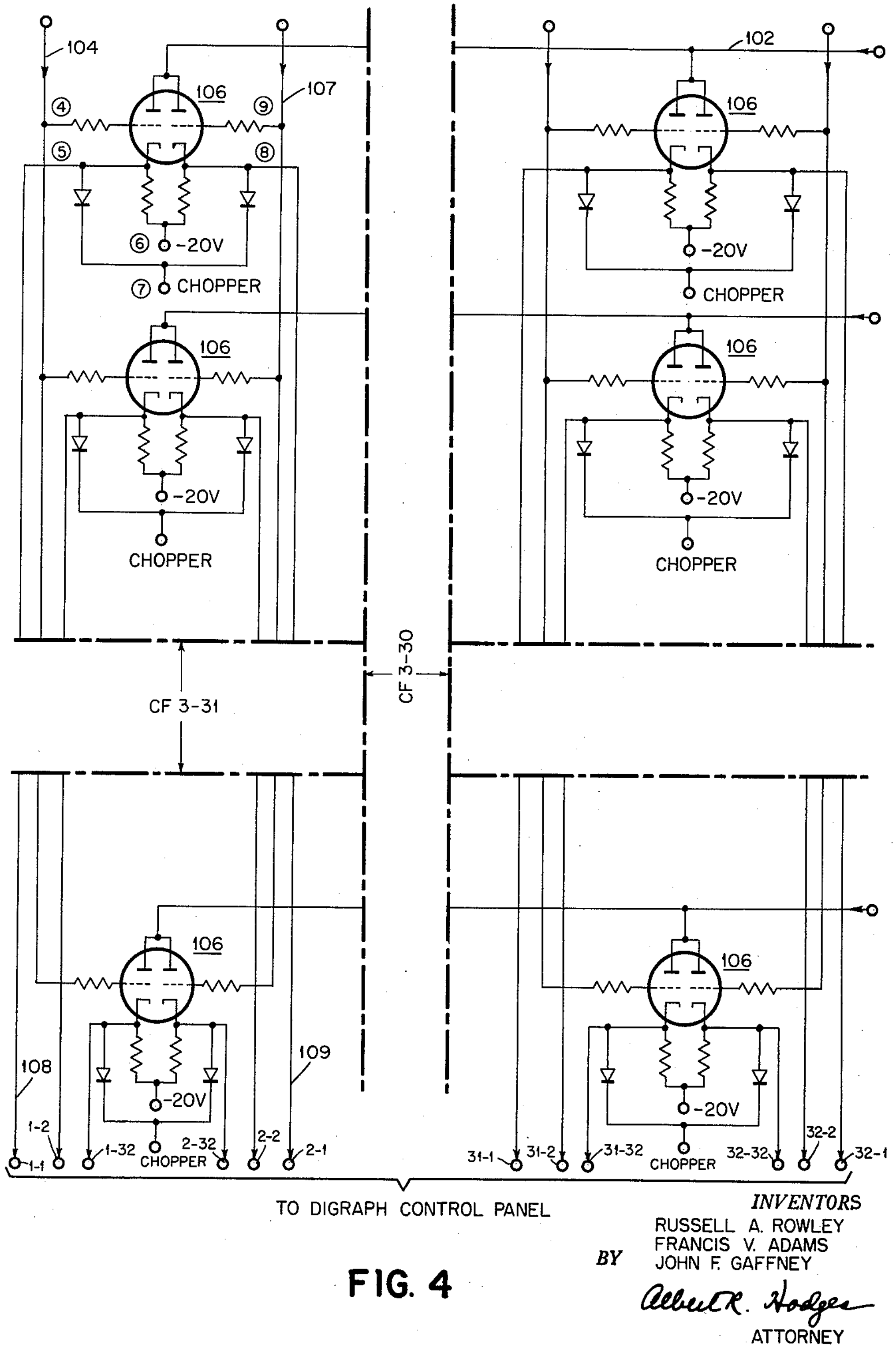
FIG. 4 is a circuit diagram, with repeated portions omitted for clarity, of the first of the two identical digraph matrices of FIG. 1.

The digraph matrix of FIG. 4 comprises 1024 cathode followers arranged in 32 rows and 32 columns. To avoid unnecessary complexity, only the first, second and thirty-second rows and the first, second, thirty-first and thirty-second columns are shown in FIG. 4. Twin cathode follower units 106 (FIG. 15) are employed, so that there are 32 rows and 16 columns of these units.

As shown, left-hand grid terminal 4 of each of the 32 units 106 comprising the first column is connected to line 104 from unit 92 in position I of the shifting register of FIG. 3, this shifting register being associated with input line 1 of cable 51 (FIG. 1). Likewise, right-hand grid terminal 9 of each of units 106 in the first column is connected by a line 107 to the differentiating unit in position I of the shifting register associated with line 2 of cable 51 (FIG. 1). Plate terminals 3 of units 106 comprising the first row are connected by line 102 to twin triode unit 98 associated with trigger unit 91 in position II of the shifting register corresponding with input line 1, shown in FIG. 3.

Individual output lines are provided for each cathode follower. For example, considering the cathode followers in unit 106 in the first row and the first column of the matrix, left-hand output terminal 5 has connected to it an output line 108, and an output line 109 is connected to right-hand output terminal 8 of this unit 106. The other cathode followers are connected in a similar manner, their grid or input terminals being connected respectively to the remaining 30 lines in cable 52 carrying the output from storage position I, and their plate terminals being connected respectively to the corresponding lines comprising output cable 53 from storage position II (FIG. 1). The 1024 output lines, including lines 108 and 109, comprise cable 59 extending from first digraph matrix 54 to the 1024 jacks of portion 60 of first digraph control panel 57 (FIG. 2).

Since only one of the 32 outputs from each of positions I and II of storage unit 50 in FIG. 1 is signalled at a time, only one of the 1024 cathode followers of the first digraph matrix of FIG. 4 will have both its plate and its grid enable at the same time, and thus only one of the 1024 lines comprising output cable 59 will carry a signal to first digraph control panel 57. For example, let it be supposed that position I of the register associated with input line 2 contains an information item, and that position II of the register associated with input line 1 contains an information item. Under this condition, the right-hand cathode follower of unit 106 in the first row and the left-hand column of the matrix will become conductive, so that an output signal is developed on line 109. The remaining cathode followers operate in a similar manner whenever both their grids and plates are signalled simultaneously.

The signals supplied to the grids vary from −45 volts to +10 volts, and the signals supplied to the plates vary from −20 volts to +150 volts. When these positive-going signals are applied simultaneously to a given cathode follower, its output line rises from −20 volts to +15 volts. The output of the cathode followers is chopped at five-bit time by a chopper signal extending from five-bit to six-bit time applied to terminal 7 of each of double cathode follower units 106. This chopper signal serves to discharge the capacitance of the output circuits and thus to improve the shape of the output signal supplied to first digraph control panel 57 (FIG. 1).

*The Switching Unit*

Switching unit 72 (FIGS. 1 and 2) comprises 2000 pentagrid switches each having two input terminals and a single output terminal. These switches serve to combine the outputs of the first and second digraph matrices (54 and 63 in FIG. 1), and to provide an output signal representing this combination to final reference matrix 83 through final reference control panel 77 (FIG. 1). One input to each switch is obtained from first digraph control panel 57, and the other input from second digraph control panel 67. When both inputs are signaled at the same time, an output is presented to final reference control panel 77. Since all of these switches have identical construction and mode of operation, only the first six switches will be shown and described in detail.

Figure 5:
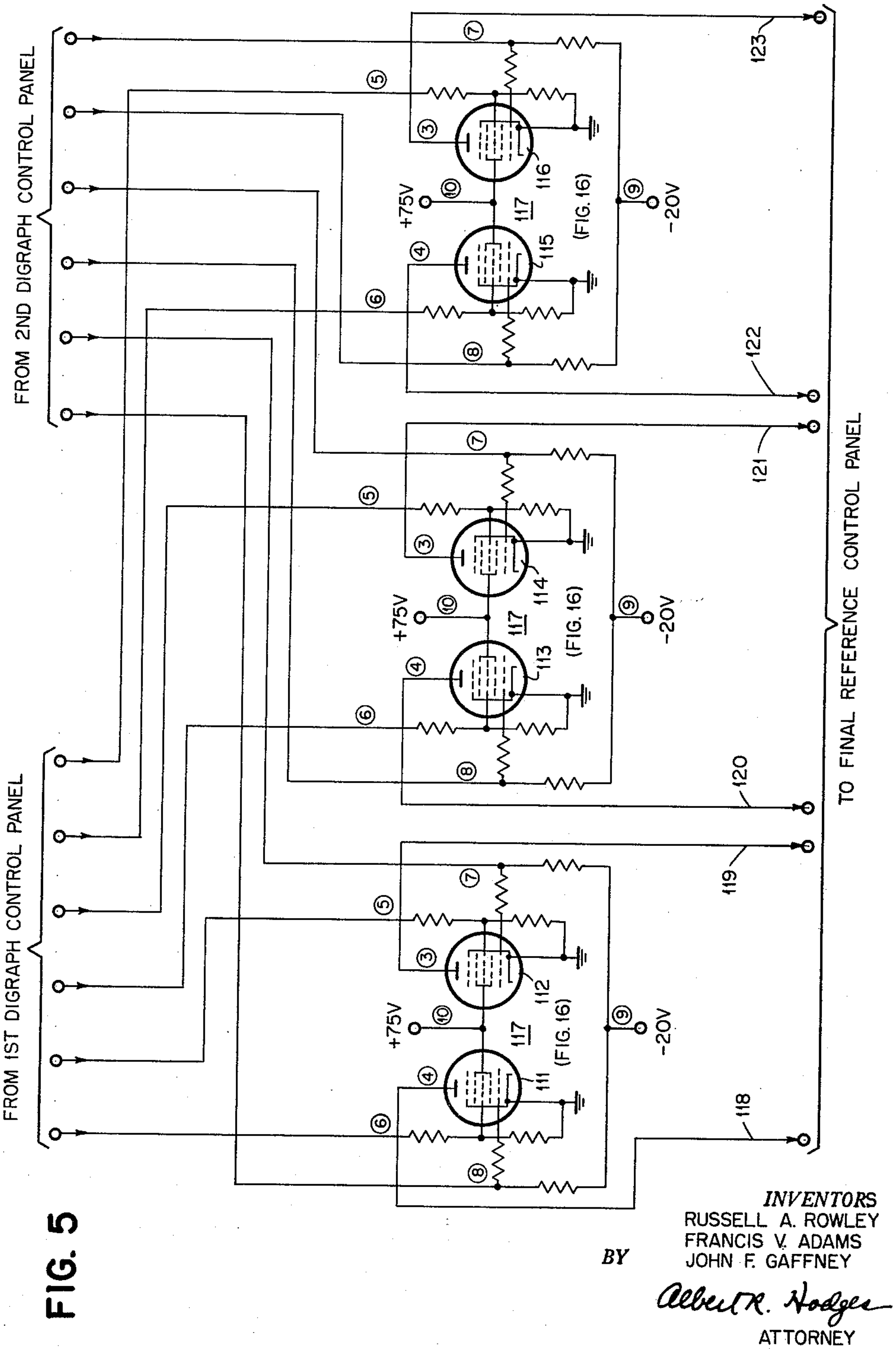
FIG. 5 is a schematic circuit diagram showing the first six of the 2000 switch sections comprising the switch unit of FIG. 1.
Figure 16:
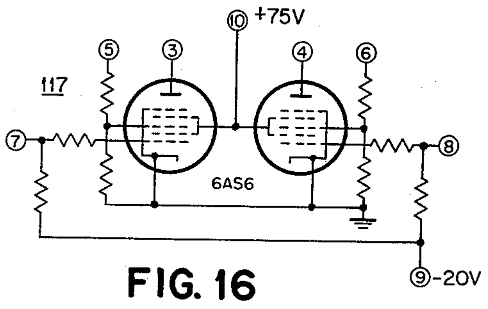

The six switches shown in FIG. 5 comprise pentode vacuum tubes 111–116 arranged in three pairs, each pair comprising a single unit 117 (FIG. 16). The No. 3 grids of tubes 111–116 are connected respectively, by means of six lines included in cable 71 (FIG. 2), to the first six jacks of portion 70 of first digraph control panel 57. Similarly, the No. 1 grids of tubes 111–116 are connected respectively by individual lines included in cable 74 to the first six jacks of portion 73 of second digraph control panel 67. The No. 3 grid of each of tubes 111–116 is normally biased, in the absence of a plug connection to the jack associated with it, in such a way that the tube would be conductive if suitable potentials were applied to the No. 1 grid and to the plate. The No. 3 grids are biased in this manner in order to facilitate the entry of pentagraphs in which the first and second characters are unspecified. It will be recalled that, under this condition, no use is made of first digraph matrix 54. Hence there is no necessity for plug-wire connections to be made to the jacks of portion 70 of first digraph control panel 57 (FIG. 2). When the latter jacks are plugged, however, the potential applied to the corresponding No. 3 grids of tubes 111–116 varies from −20 volts to +15 volts.

The No. 1 grids of tubes 111–116 are normally biased in such a manner as to prevent conduction of the tube. The input provided by second digraph control panel 67 when one or more of the corresponding jacks is plugged causes the corresponding No. 1 grid to vary between −20 and +15 volts. When both the No. 1 and the No. 3 grids of a given tube are signalled to allow conduction, this tube will be able to conduct when plate power is supplied to it. The plates of tubes 111–116 are connected respectively by individual lines 118–123 included in cable 75 (FIG. 2) to the first six jacks in portion 76 of final reference control panel 77. When a given one of these jacks is connected by a plug wire to one of the jacks of portions 78, 79 and 80 of control panel 77, the plate of the corresponding switching tube in unit 72 is energized so that, when this tube is permitted to be conductive by the potentials applied to its No. 1 and No. 3 grids, an appropriate output signal is developed.

*The Final Reference Matrix*

Figure 6:
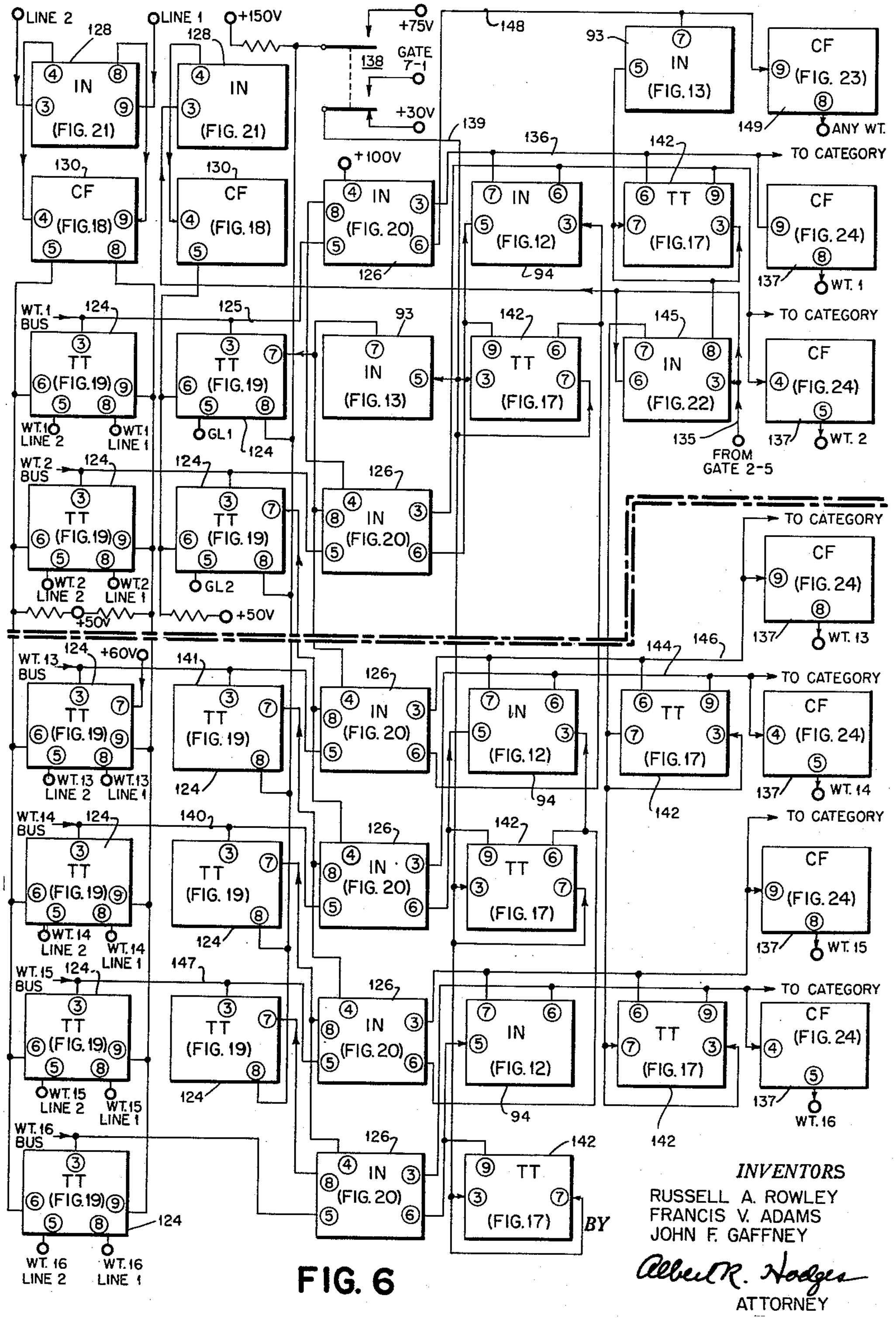
FIG. 6 is a diagram, partly in block form, of the final reference matrix and multiple weight suppression units of FIG. 1.

Final reference matrix 83 (FIG. 1) comprises 390 mixer units arranged in 33 columns. Columns 1–32 correspond respectively to lines 1–32 of cable 84 (FIG. 1). Column 33 is used to provide an output from the matrix when the final character of the pentagraph is not specified. The first 10 columns have 16 rows corresponding to weights 1–16. These 160 mixers are associated with the 160 jacks of portion 78 of final reference control panel 77. The next 22 columns have 10 rows corresponding to weights 1–10. These 220 mixers are associated with the 200 jacks of portion 79. Column 33 has 10 rows corresponding to weights 1–10. These 10 mixers are associated with the 10 jacks of portion 80. For clarity, FIG. 6 shows only the mixers of the first two line columns and rows 1, 2 and 13–16. The first two mixers of column 33 are also shown. These mixers, with related equipment, comprise final reference matrix 83 (FIG. 1).

The left-hand column of FIG. 6 shows a number of twin triode units 124 (FIG. 19), all associated with input lines 1 and 2 (of cable 84, FIG. 1) and corresponding respectively from top to bottom with weights 1–16. Each unit 124 comprises two mixers. Considering first the topmost unit 124, corresponding with weight 1, terminal 8 is connected to the jack in the first column and the first row of portion 78 of final reference control panel 77 (FIG. 2). Terminal 5 of this unit 124 is connected to the jack in the first column and the second row of portion 78 of control panel 77. Terminal 9 of unit 124 is signalled from input line 1, and terminal 6 is signalled from input line 2. The other 15 units 124 in this column are also signalled by input lines 1 and 2, their terminals 8 and 5 being connected to the jacks of portion 78 of control panel 77 associated respectively with lines 1 and 2 and corresponding respectively to weights 2–16.

Common plate terminal 3 of topmost unit 124 is connected by weight 1 bus 125 to terminal 5 of an inverter unit 126 (FIG. 20), so that resistor 127 in this inverter unit serves as the plate load resistor for the two mixers of unit 124. When either one of the two mixers in this unit 124 is allowed to conduct, the resultant increase in voltage drop across resistor 127 will provide a weight 1 signal on bus 125. The remaining units 124 of the first column are similarly associated with the respective weight buses, as shown. The mixers of the other rows and columns (not shown in FIG. 6) operate in a similar manner.

Figure 21:
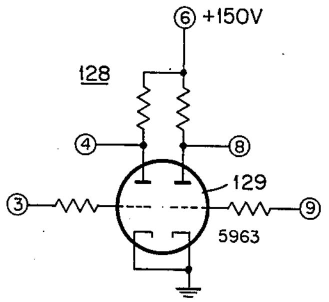

Input line 1 (of cable 84, FIG. 1) i sconnected to terminal 9 of double inverter unit 128 (FIG. 21). When no input signal is present, this line is normally at −20 volts, so that the right-hand half of tube 129 is nonconductive and terminal 8 is at approximately +150 volts.

This terminal is connected to terminal 9 of double cathode follower unit 130 (FIG. 18), so that the right-hand portion of tube 131 is normally conductive and terminal 8 is at approximately +75 volts. Terminal 8 is connected to terminal 9 of twin triode unit 124 (FIG. 19), so that, due to the action of crystal diode 132, right-hand cathode 133 of tube 134 is not permitted to drop below approximately +75 volts. Under this condition, the right-hand half of tube 134 remains nonconductive, and no weight signal can be developed on weight 1 bus 125.

Now let it be assumed that a signal pulse is present on input line 1, thus raising the voltage of this line to +30 volts. Under this condition, the right-hand portion of tube 129 of inverter unit 128 will become conductive, and the resultant negative-going voltage at its terminal 8 will cause cutoff of the right-hand portion of tube 131 in double cathode follower unit 130. Under this condition, terminal 8 of unit 130 drops to approximately +50 volts, so that cathode 133 of unit 124 is no longer required to remain at +75 volts. This is the first condition which must be met before the right-hand portion of tube 134 may become conductive.

The second condition for conductivity of the right-hand portion of tube 134 is that a relatively low-impedance path must be provided between terminal 8 of this unit 124 and ground. This condition is met when the jack of portion 78 of final reference control panel 77 connected with this terminal 8 is in turn connected by a plug wire to a jack portion 76 of panel 77 which is associated with a switching tube of unit 72 previously made capable of being conductive by the application of appropriately positive potentials to its No. 1 and No. 3 grids, as previously explained in connection with FIG. 5.

If the two conditions outlined above are both met, the right-hand portion of tube 134 of mixer unit 124 becomes conductive, with the result that a weight signal is developed on weight 1 bus 125. It will be apparent, therefore, that a weight 1 signal is developed on this bus only when a predetermined sequence of characters comprising a pentagraph has appeared on the intput lines comprising cable 51 of FIG. 1, the last character having been represented by a signal on line 1. The other mixer units of the first column of FIG. 6 operate in a similar manner to provide weight signals on the associated weight buses when other predetermined sequences of characters are recognized.

If the last character of the pentagraph to be recognized is unspecified, the plug wire is inserted into the desired one of the ten jacks of portion 80 of control panel 77 (FIG. 2), depending upon the weight to be assigned to the pentagraph being recognized. The first jack is connected to terminal 5 of the uppermost twin triode unit 124 in the second column of FIG. 6. Output terminal 3 of this unit 124 is connected to weight 1 bus 125. A final reference gate, extending from 2-bit to 5-bit time and supplied from a suitable source (not shown), is applied through a line 135, an inverter unit 128 (FIG. 21) and a cathode follower unit 130 (FIG. 18) to terminal 6 of this unit 124, so that the left-hand portion of tube 134 of this unit becomes conductive during final reference gate time if its terminal 5 is signalled by the presence of a signal at the first jack of portion 80 of control panel 77, regardless of which input line (of cable 84, FIG. 1) is signalled at this time. This produces a weight 1 signal on weight 1 bus 125. Other twin triode units 124, only the first of which is shown in FIG. 6, operate in a similar manner to provide signals on the corresponding weight buses whenever a signal is present at the associated jack of portion 80 of control panel 77 (FIG. 2).

Figure 24:
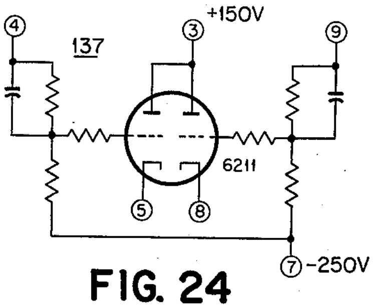

The weight signal developed on weight 1 bus 125 is a negative-going pulse. This signal appears at output terminal 3 of inverter unit 126 (FIG. 20) as a positive-going pulse which is applied, by a line 136, to terminal 9 of uppermost cathode follower unit 137 (FIG. 24). The weight 1 line of cable 87 (FIG. 1) is connected to output terminal 8 of this unit. The other 15 weight signals are similarly inverted and supplied to the corresponding weight lines of cable 87, as indicated in FIG. 6. It is assumed for the moment that multiple weight suppression unit 86 is in its inoperative condition.

*The Multiple Weight Suppression Unit*

Normally, all the weight signals which are generated on the weight buses appear on the corresponding weight lines of cable 87 (FIG. 1). The purpose of multiple weight suppression unit 86 is to suppress the lesser weight output signal or signals, at the option of the operator, when two or more character groups are recognized simultaneously and are classified into different weights. This unit operates by placing fictitious weight signals on all of the weight lines lower than the highest signal weight line, and by then suppressing the output on all but the highest signalled weight line.

The operation of unit 86 is controlled by a double-throw switch 138. When this switch is in its normal or inoperative position, as shown in FIG. 6, right-hand cathode terminals 8 of twin triode units 124 (FIG. 19) in the second column are at a potential of approximately +150 volts, so that the right-hand portions of tubes 134 in each of units 124 are rendered nonconductive, regardless of any positive-going signals which may be applied to grid terminals 7 of these units. These units, as will be described later, are used to develop the fictitious weight signals. Thus no fictitious weight signals are developed on the weight buses associated respectively with output terminals 3 of these units. Furthermore, steps must be taken to prevent the suppression of lower weight signals which are due to the recognition of additional predetermined character groups. This is accomplished by the application of a positive potential to chop signal bus 139, in a manner to be described below. With switch 138 in its normal position, therefore, multiple weight suppression unit 86 is in its inoperative condition, so that simultaneously occurring weight output signals may pass through this unit.

When switch 138 is thrown to its upper or operative position, the potential on terminals 8 of units 124 in the second column is reduced to approximately +75 volts, thus permitting each unit to respond to a positive-going signal applied to its grid terminal 7 and therefore to cause the development of a fictitious weight signal on the corresponding weight bus. Additionally, a positive-going gate extending from 7-bit to 1-bit time from a suitable source (not shown) is applied to signal bus 139 with this switch setting.

In order to make it clear how the fictitious weight signals are introduced, let it be assumed that switch 138 is in its upper or operative position and that the highest weight bus which is signalled is weight 14 bus 140. The negative-going weight signal on bus 140, which because of circuit delays becomes effective between 7-bit time and 1-bit time and remains effective at least until 5-bit time, causes cutoff of both halves of inverter unit 126 associated with this bus. Under these conditions a positive-going signal appears on terminals 6 and 8 of unit 126 at the termination of the gate on signal bus 139, due to the action of unit 142 whose terminal 9 is connected to terminal 6 of unit 126. The resultant positive-going output signal at terminal 8 of inverter unit 126 is supplied to terminal 7 of twin triode unit 124 associated with weight 13 bus 141. When this mixer receives this signal, it becomes conductive and places a fictitious weight signal on weight 13 bus 141. Inverter unit 126 associated with weight 13 bus 141 inverts this fictitious weight signal and supplies it to the fictitious weight mixer associated with the weight 12 bus. This process cascades until a fictitious weight signal is entered on weight 1 bus 125. In each case, the fictitious weight signal on a weight bus is treated in the same manner as a real weight signal. As a result, both halves of each inverter unit 126 associated with weight lines 1–14 are cutoff, so that a weight output signal would normally occur on each corresponding weight output line, except for the weight suppression function to be described below.

Figure 20:
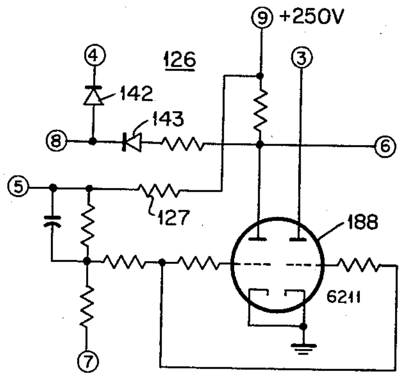

As shown in FIG. 20, each inverter unit 126 has a crystal diode 142 connected between its terminals 4 and 8. As shown in FIG. 6, these diodes 142 are connected in a chain by a connection from terminal 4 of each unit 126 to terminal 8 of the inverter unit associated with the next lower weight bus. This diode chain serves to expedite the cascading of fictitious weights on the lower weight buses by sending signals to several units in advance. The provision of cascading is an important feature of the present invention. If a weight signal already exists on one or more of the lesser weight buses, it will be treated as a fictitious weight signal. The fact that two inputs to a given weight bus attempt to signal the weight bus simultaneously has no appreciable effect upon the signal to the associated inverter unit 126. A weight signal on a given weight bus will not affect the next higher weight bus because of the isolation effect provided by each diode 142.

The 7–1 gate on signal bus 139 when switch 138 is in its upper position is also applied to the diode chain through inverter unit 93. The resultant chop signal serves to discharge the capacitances associated with the diode chain between 7-bit and 1-bit time, thus preparing the circuit for the arrival of new information. As briefly mentioned above, this 7–1 positive gate is applied through inverter unit 142 (FIG. 17) to terminal 6 of each inverter unit 126 except the one corresponding with weight 1 bus 125, for the purpose of preventing possible spurious outputs from these inverter units during the time chop signal bus 139 is at a positive potential. How this is accomplished will be apparent by reference to FIG. 20, in which diode 143 is shown connected between terminals 6 and 8. This action helps reset the fictitious weight circuits from 7-bit to 1-bit time when switch 138 is in its upper position.

Figure 17:
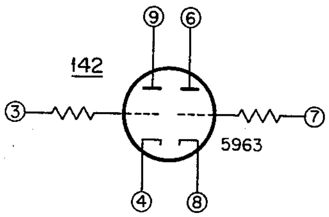
Figure 18:
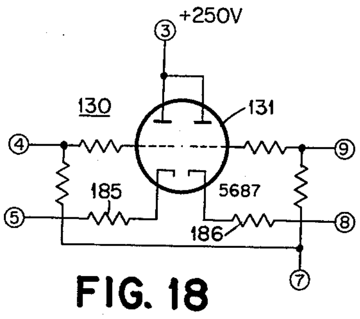
Figure 19:
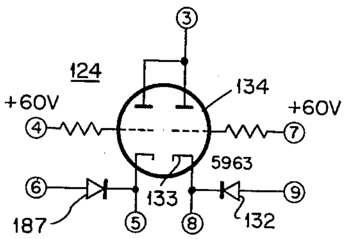

It is now assumed that the highest desired weight signal has appeared on weight 14 bus 140, and that the lesser weight buses have fictitious signals placed upon them in the manner just described. Under these conditions, the weight signal presented to inverter unit 126 associated with weight 14 bus 140 starts between 7-bit time of one character and 1-bit time of the following character, and ends at 5-bit time. During the time that this signal is present at input terminal 5 of inverter unit 126 associated with weight 14 bus 140, terminal 3 of this inverter unit would normally carry a positive-going pulse which would be supplied to weight 14 line 144. The development of this positive-going pulse is prevented, however, by the connection between weight 14 line 144 and terminal 9 of normally conductive inverter unit 142 (FIG. 17). The final reference gate 2–5 signal on bus 135 is applied through inverter unit 145 (FIG. 22) to terminals 3 and 7 of each of inverter units 142 (fifth column). When this signal is present, inverter units 142 are cut off, so that the signal on weight 14 output line 144 is permitted to reach cathode followed unit 137 from 2-bit to 5-bit time. This is the highest weight signal present under the assumed conditions, and the only one which is to be permitted to reach the weight lines of cable 87 (FIG. 1). It will now be explained how the suppression of the lesser weight signals is accomplished, special reference being made to the weight 13 signal by way of example.

The fictitious weight signal on weight 13 line 146 will be suppressed because the left-hand half of inverter unit 94, associated with this line, is conducting from 1-bit to 5-bit time, so that line 146 is held down due to the connection between this line and terminal 7 of this inverter unit. This half of the inverter unit is conducting because its input terminal 5 is positive, since it is connected to output terminal 6 of inverter unit 126 associated with weight 14 bus 140. It will be recalled that the presence of a weight signal on weight 14 line 140 causes a positive signal at output terminal 6 of the associated inverter unit. By virtue of the connection between this terminal 6 and terminal 5 of inverter unit 94, the left-hand portion of this inverter unit becomes conductive and weight 13 output line 146 is held down during the interval from 2-bit to 5-bit time while the weight signals are being read out. All the weight output signals less than weight 14 will be suppressed by a similar circuit associated with each weight output line. The weight 13 signal is suppressed by the action of the weight 14 signal as just explained. The weight 12 output will be suppressed by the action of the fictitious weight signal on weight 13 output line 146. The fictitious weight signal on the weight 12 bus will suppress the output on the weight 11 output line. The action continues until all the fictitious weights have been suppressed. The weight signal on weight 14 output line 144 will not be suppressed because the weight 15 bus has not been signaled. When there is no weight signal on weight 15 bus 147, a negative-going signal is present at terminal 6 of inverter unit 126 associated with this bus. This terminal is connected to input terminal 3 of the corresponding inverter unit 94, so that the negative signal present on it prevents the right-hand portion of this inverter from conducting and suppressing the weight signal on weight 14 output line 144. Thus it will be apparent that a signal is required on the next higher weight bus to suppress a signal on a given output line, thus explaining the necessity for supplying fictitious weight signals on the lesser weight buses.

The weight suppressing circuit arrangements just described are inoperative when switch 138 is in its lower position, so that signal bus 139 is at a positive potential. This is due to the fact that inverter units 142 (in the fourth column of FIG. 6) are held conducting. This will place a negative signal on terminals 3 and 5 of each inverter unit 94 (fourth column of FIG. 6), thus causing the corresponding halves of these units to be cut off. While these inverter units are cut off, they will have no effect on the output signals on the weight output lines respectively associated with them. Due to the action of switch 138, signal bus 139 is always held positive when the multiple weight suppression feature is not being employed.

Another output of the arrangement of FIG. 6 is the ANY weight signal available on output line 148 from 2-bit to 5-bit time every time a weight output line is signalled while the multiple weight suppression circuits are in use and the final reference gate is present. In order to provide this signal, a connection is made to output terminal 6 of inverter unit 126 associated with weight 1 bus 125. The resultant signal is sampled by the final reference gate 2–5 signal on bus 135 by means of inverter unit 145, twin triode unit 142 and inverter unit 93 (all shown in the upper portion of the fifth column of FIG. 6). This signal, which may be supplied through a cathode follower unit 149 (FIG. 23), is obtained due to the cascading effect of the fictitious weight signals and is the signal which would normally be supplied to cause a fictitious weight signal to be placed on the next lower line.

*The Category Detector Unit*

Category detector unit 89 (FIG. 1) provides a category output signal on the N line of cable 90 whenever a weight $2N-1$ output signal is followed by a weight 2N output signal, where N is a number 1 through 8. This signal will be present on the category output line (cable 90, FIG. 1) from 2-bit to 5-bit time of the 2N weight. This is the time interval during which the final reference gate 2–5 signal reads out the 2N weight signal. The end of the $2N-1$ weight signal operates a trigger circuit which remains operated through the next occurrence of the final reference gate and conditions one of the inputs of an inverter switch unit. If the 2N weight signal occurs while the trigger circuit remains operative, this weight signal is permitted to pass through the inverter switch and through a cathode follower unit to the N line of cable 90.

Figure 7:
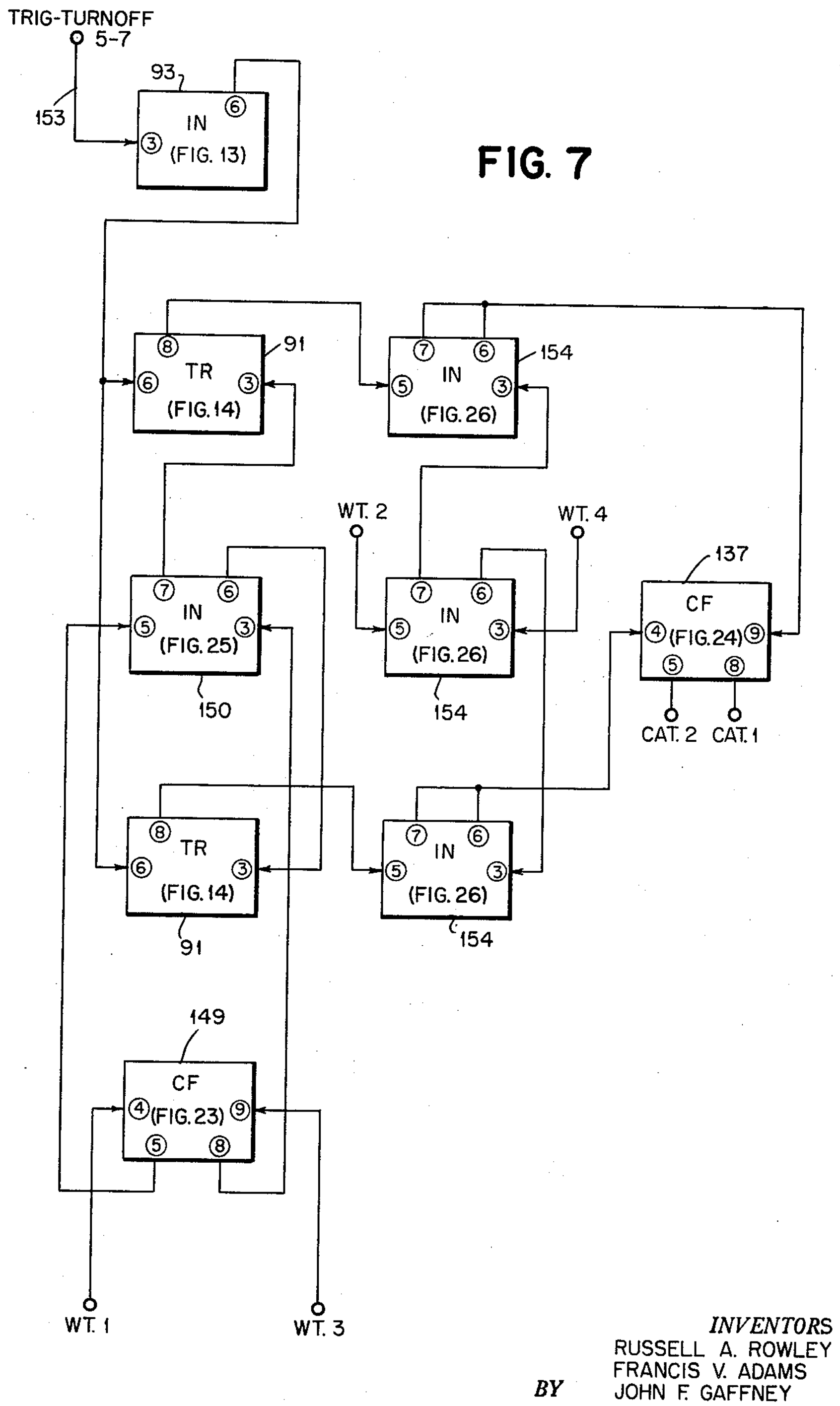
FIG. 7 is a block diagram of a portion of the category detector unit of FIG. 1.
Figure 14:
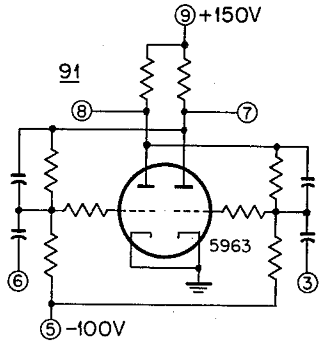
Figure 23:
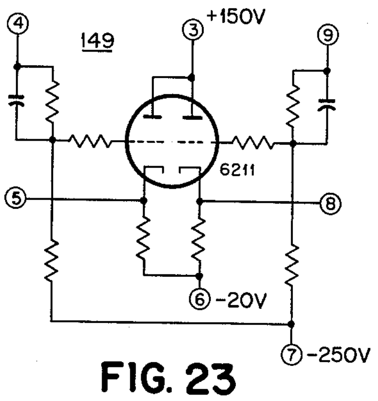
Figure 25:
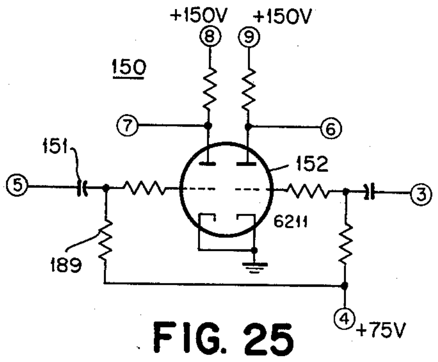

Reference is now made to FIG. 7 of the drawings, which shows a portion of the category detector unit. The operation of this unit will be described by using as an example a weight 1 signal followed by a weight 2 signal to produce a category signal output on line 1 of cable 90 (FIG. 1). The weight 1 signal, which comprises a positive-going pulse extending from 2-bit to 5-bit time, is applied to terminal 4 of double cathode follower unit 149 (FIG. 23). Output terminal 5 of this cathode follower is connected to input terminal 5 of a normally conducting double inverter unit 150 (FIG. 25). As shown in the latter figure, this unit includes a capacitor 151 connected in series with input terminal 5. The leading edge of the signal applied to terminal 5 does not affect the inverter but the trailing edge, differentiated by capacitor 151, causes the left-hand portion of tube 152 to be cut off. This portion of this tube remains cut off until after the effects of the leading edge of trigger turnoff 5–7 signal, applied from a suitable source (not shown) immediately following each final reference gate to turnoff bus 153, have ceased. The left-hand portion of tube 152 will then resume conduction, so that a negative-going signal is developed at output terminal 7 and applied to input terminal 3 of trigger unit 91 (FIG. 14). Thus trigger unit 91 will be turned ON at approximately 6-bit time after the weight 1 signal and will remain ON until 5-bit time of the following trigger turnoff 5–7 signal. The latter signal occurs immediately after the final reference gate 2–5 signal.

While trigger unit 91 is ON, it will supply a negative-going signal to input terminal 5 of inverter unit 154 (FIG. 26), this unit operating as a coincidence switch. It comprises two normally conducting inverters with a common plate load. When both inverters are cut off simultaneously, a positive-going signal is developed at joined terminals 6 and 7, and this signal is supplied through cathode follower unit 137 to category output line 1 connected to terminal 8 of the latter unit. The negative-going signal from trigger unit 91 cuts off one of the inverters of unit 154 and, if a weight 2 signal is supplied through the left-hand portion of inverter unit 154 (third row in FIG. 7) before trigger unit 91 is turned off at 5-bit time by the trigger turnoff 5–7 signal supplied from turnoff bus 153 through inverter unit 93, the inverter switch will produce an output.

It will be understood that the category detector circuits associated with remaining weight lines 3–16 are arranged and operate in a similar manner to provide category output signals on the appropriate category output line whenever each odd-valued weight signal is immediately followed by the next succeeding even-valued weight signal.

*Recognition of a Particular Pentagraph*

Figure 8:
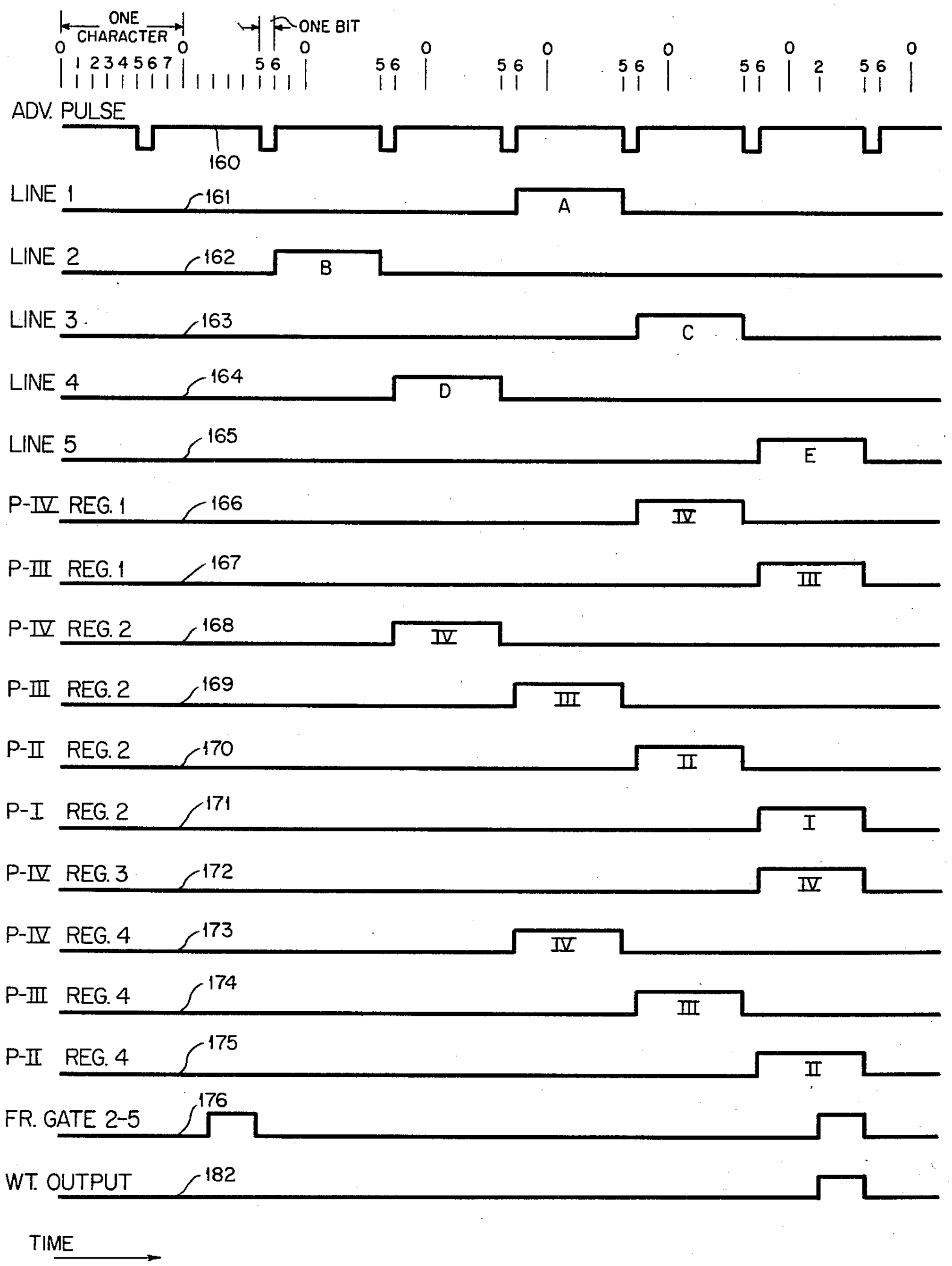
FIG. 8 is a timing chart illustrating graphically the operation of the system of FIG. 1 in the recognition of a particular group of five information characters.

Operation of the system of FIG. 1 will be better understood by reference to FIG. 8 of the drawings, which is a timing chart graphically portraying the recognition of a particular pentagraph or group of five information characters. In FIG. 8, curve 160 shows the advance pulses, each of which is a negative-going pulse which rises at 5-bit time and falls at 6-bit time. These pulses determine the basic timing of the system as a whole.

Let it be assumed that characters A, B, C, D and E are represented respectively on lines 1–5 of input cable 51 (FIG. 1). Curves 161–165 show the input signals appearing on lines 1–5. Each input signal comprises a positive-going pulse which rises at 6–bit time of one character interval and falls at 5-bit time of the following character interval. It will be apparent from curves 161–165 that the signal on line 2, corresponding with character B, appears first, followed in succession by character D on line 4, character A on line 1, character C on line 3, and character E on line 5. This pentagraph BDACE is the group of five characters which is to be recognized.

Curves 166–175 indicate the production of output signals by the four positions of the first four registers comprising reference storage unit 50 of FIG. 1. For example, curve 166 shows that position IV of register 1, associated with input line 1, is providing an output during the fourth character time of the operating cycle of the system. The manner in which the production of an output signal is stepped along through the successive positions of each register is depicted by these curves.

Referring now to the fifth character interval of the operating cycle, it will be apparent from curves 171 and 175 that position I of register 2 and position II of register 4 are both providing an output, so that an output is developed on the corresponding line of cable 59 (FIG. 1), and this output is passed through first digraph control panel 57 to a switch of switching unit 72 which is selected by the plug-wire connections on panel 57. As illustrated by curves 167 and 172, position III of register 1 and position IV of register 3 are both providing an output during the fifth character time of the operating cycle now under consideration. These outputs are combined in second digraph matrix 63 (FIG. 1) and supplied through second digraph control panel 67 to the previously selected switch of switching unit 72. The resultant combined output, corresponding to characters BDAC, is supplied through a line of cable 82 to final reference matrix 83, in which it is in turn combined with the output signal on line 5 of cable 84 which, as indicated by curve 165, is present during this fifth character interval.

The resultant output signal, developed on a line of cable 85, has a weight value which was assigned to it by suitable plug connections on final reference control panel 77. This output signal is gated by the final reference gate, which rises at 2-bit time and falls at 5-bit time during the fifth character interval, as shown by curve 176. The resultant weight output signal, which appears upon the proper one of the 16 lines of cable 87, is illustrated by curve 182.

*The Basic Circuit Components*

Figure 10:
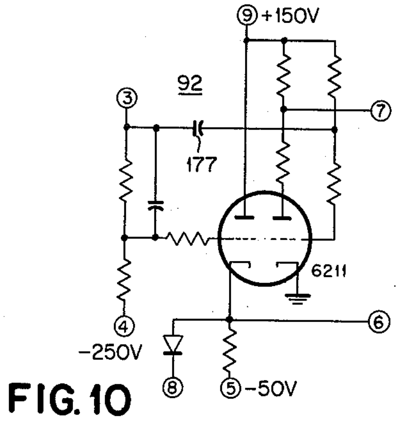
Figure 11:
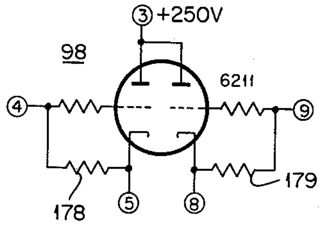

For convenience, the basic circuit components, some of which are used in a number of different places in the system as a whole, are shown individually in FIGS. 9–26. The units of FIGS. 9–11 are utilized in the arrangement of FIG. 3. The inverter unit of FIG. 9 comprises two normally conducting inverters. The input to each is through a large capacitor, giving each input circuit a relatively long time constant. A negative-going pulse is required to cut each inverter off and produce an output signal of approximately 200 volts. The unit of FIG. 10 comprises a cathode follower and a pulse generator. The left-hand half of this unit operates on a conventional cathode follower to transform signal levels as input terminal 3 to a +15 to −40 volts range on output terminal 6. The diode connected to terminal 8 provides for chopping the right-hand half of the unit if normally conducting. A negative-going signal applied to input terminal 3 is differentiated through capacitor 177 to cut off the right-hand triode, producing a positive-going 50-volt pulse of about 10 microsecond duration at output terminal 7. The twin triode unit of FIG. 11 is used for gating the plates of other tubes by connecting to terminals 5 and 8. Resistors 178 and 179, connected respectively between terminals 4 and 5 and terminals 8 and 9, facilitate the pulling down of the gated plates.

The units of FIGS. 12 and 13 are used in the arrangements of FIGS. 3 and 6. The inverter unit of FIG. 12 comprises two independent inverters. The inputs to the inverters comprise compensated dividing networks respectively designated by the reference numerals 180 and 181.

The inverter unit of FIG. 13 comprises two independent low-to-high inverters.

Figure 15:
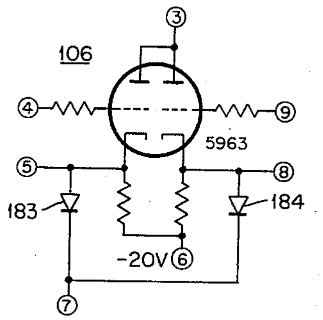

The trigger unit of FIG. 14 is used in the arrangements of FIGS. 3 and 7, and is of the standard Eccles-Jordan type. The cathode follower unit of FIG. 15 is used in the arrangement of FIG. 4. In this device negative-going "chopping" signals appearing on terminal 7 are applied by means of crystal diodes 183 and 184 to output line capacitances. The dual pentode switch unit of FIG. 16, used in the switching unit of FIG. 5, comprises a pair of pentode tubes in each of which the conduction is controlled by the application of suitable voltages to the No. 1 or control grid and to the No. 3 or suppressor grid.

Figure 22:
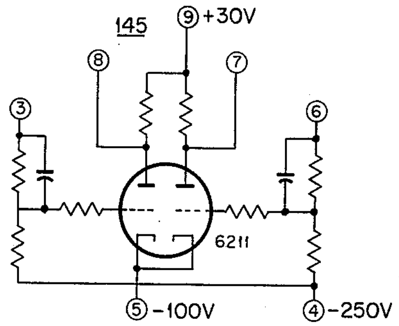

The units of FIGS. 17–22 are used in the arrangement of FIG. 6. The unit of FIG. 17 is a twin triode device employing a type 5963 tube. The unit of FIG. 18 consists of two power cathode followers. Resistors 185 and 186 provide degeneration in applications where both halves of tube 131 are used in parallel. The unit of FIG. 19 comprises a twin triode. Diodes 132 and 187 serve to clamp the cathodes above grid potential. When suitable potentials are applied to the cathodes and when suitable external circuits are connected to terminals 5 and 8, conduction is initiated by removal of the clamp potentials applied to terminals 6 and 9. The plate supply and load resistors are incorporated in the external circuitry. Although terminal 7 is indicated as being at +60 volts, it will be understood that other potentials may be applied to this terminal as shown, for example, in the second column of FIG. 6 of the drawings. The inverter unit of FIG. 20 is normally conducting. When a negative-going signal is aplied to input terminal 5, however, tube 188 is rendered nonconductive and positive-going output signals may be developed at terminals 3, 4, 6 and 8. The purpose of diodes 142 and 143 has already been discussed in connection with FIG. 6 of the drawing. The inverter of FIG. 21 is a dual low-to-high inverter with direct inputs from terminals 3 and 9, and outputs at terminals 4 and 8. The two inverters are independent but receive their plate voltage from common termnial 6. The inverter unit of FIG. 22 is a dual low-to-low inverter with a compensated divider network associated with each half. The cathodes of the two inverters are internally commoned.

The devices of FIGS. 23 and 24 are used in the arrangements of FIGS. 6 and 7. The cathode follower unit of FIG. 23 is a dual device with a common plate connection but individual input and output connections. The input is a high-level (+150 to +50 volt), and the output is a low-level (+30 to −20 volt) signal. The cathode follower of FIG. 24 is a dual unit with a common plate connection and separate inputs and outputs. The cathode load resistors are external to this unit.

Figure 26:
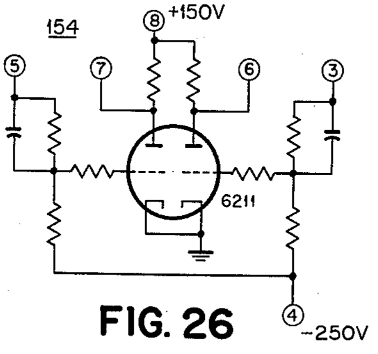

The devices of FIGS. 25 and 26 are used in the category detector unit of FIG. 7. The unit of FIG. 25 comprises two normally conducting low-to-high inverters, each of which has its inputs supplied through a differentiating network. Referring to input terminal 5, this network comprises capacitor 151 and resistor 189. The inverter unit of FIG. 26 is of the dual high-to-high type.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for identifying a plurality of predetermined sequences of information items, comprising: an individual multiposition shift register for receiving each unique information item, means for periodically advancing each said information item from position to position through each said shift register, means connected to each position of each said shift register and responsive to an information item stored therein to provide an output, sensing means connected to said outputs for detecting sequences of information items stored respectively in the positions of said shift registers, and weighing means connected to said sensing means and responsive to said sequences of information items to provide weight output signals in accordance with values placed on predetermined sequences of information items.

2. Apparatus for identifying a plurality of predetermined sequences of information items, comprising: an individual multiposition shift register for receiving each unique information item, means for periodically advancing each said information item from position to position through each said shift register, means connected to each position of each said shift register and responsive to an information item stored therein to provide an output, sensing means connected to said outputs for detecting sequences of information items stored respectively in the positions of said shift registers, and weighing means connected to said sensing means and responsive to said sequences of information items to provide weight output signals in accordance with values placed on predetermined sequences of information items, and means adapted to receive said weight output signals and to suppress all simultaneously occurring signals except the one indicating the most significant weight.

3. Apparatus for identifying a plurality of predetermined sequences of information items, comprising: an individual multiposition shift register for receiving each unique information item, means for periodically advancing each said information item from position to position through each said shift register, means connected to each position of each said shift register and responsive to an information item stored therein to provide an output, sensing means connected to said outputs for detecting sequences of information items stored respectively in the positions of said shift registers, and weighing means connected to said sensing means and responsive to said sequences of information items to provide weight output signals in accordance with values placed on predetermined sequences of information items, means adapted to supply fictitious weight signals on all weight output lines which have a weight output less than that carrying the highest valued signal, and means for suppressing the weight signals on all said weight output lines except the one indicating the most significant weight.

4. Apparatus for identifying a plurality of predetermined sequences of information items, comprising: an individual multiposition shift register for receiving each unique information item, means for periodically advancing each said information item from position to position through each said shift register, means connected to each position of each said shift register and responsive to an information item stored therein to provide an output, sensing means connected to said outputs for detecting sequences of information items stored respectively in the positions of said shift registers, and weighing means connected to said sensing means and responsive to said sequences of information items to provide weight output signals in accordance with values placed on predetermined sequences of information items, and means for developing a category signal when said weight output signals occur in a predetermined sequence.

5. Apparatus for identifying a plurality of predetermined sequences of information items, comprising: an individual multiposition shift register for receiving each unique information item, means for periodically advancing each said information item from position to position through each said shift register, means connected to each positon of each said shift register and responsive to an information item stored therein to provide an output, sensing means connected to said outputs for detecting sequences of information items stored respectively in the positions of said shift registers, and weighing means connected to said sensing means and responsive to said sequences of information items to provide weight output signals in accordance with values placed on predetermined sequences of information items, means adapted to receive said weight output signals and to suppress all simultaneously occurring signals except the one indicating the most significant weight, and means for developing a category signal when said unsuppressed weight signals occur in a predetermined sequence.

6. Apparatus for identifying a plurality of predetermined sequences of information items, comprising: an individual multiposition shift register for receiving each unique information item, means for periodically advancing each said information item from position to position through each said shift register, means connected to each position of each said shift register and responsive to an information item stored therein to provide an output, sensing means connected to said outputs for detecting sequences of information items stored respectively in the positions of said shift registers, and weighing means connected to said sensing means and responsive to said sequences of information items to provide weight output signals in accordance with values placed on predetermined sequences of information items, and means for developing a category signal whenever an odd-valued weight output signal is immediately followed by the next succeeding even-valued weight output signal.

7. Apparatus for identifying a plurality of predetermined sequences of information items, comprising: an individual multiposition shift register for receiving each unique information item, means for periodically advancing each said information item from position to position through each said shift register, means connected to each position of each said shift register and responsive to an information item stored therein to provide an output, sensing means connected to said outputs for detecting sequences of information items stored respectively in the positions of said shift registers, and weighing means connected to said sensing means and responsive to said sequences of information items to provide weight output signals in accordance with values placed on predetermined sequences of information items, means adapted to receive said weight output signals and to suppress all simultaneously occurring signals except the one indicating the most significant weight, and means for developing a category signal whenever an unsuppressed odd-valued weight output signal is immediately followed by the next succeeding unsuppressed even-valued weight output signal.

8. Apparatus for identifying a plurality of predetermined sequences of information items, comprising: an individual multiposition shift register for receiving each unique information item; means for periodically advancing each said information item from position to position through each said shift register, means connected to each position of each said shift register and responsive to an information item stored therein to provide an output, sensing means connected to said outputs for detecting sequences of information items stored respectively in the positions of said shift registers, said sensing means comprising plural matrices and presettable control panels associated therewith; and weighing means connected to said sensing means and responsive to said sequences of information items to provide weight output signals in accordance with values placed on predetermined sequences of information items.

9. Apparatus for identifying a plurality of predetermined sequences of information items, comprising: an individual multiposition shift register for receiving each unique information item; means for periodically advancing each said information item from position to position through each said shift register, means connected to each position of each said shift register and responsive to an information item stored therein to provide an output, sensing means connected to said outputs for detecting sequences of information items stored respectively in the positions of said shift registers, said sensing means comprising matrices responsive respectively to pairs of said register positions; and weighing means connected to said sensing means and responsive to said sequences of information items to provide weight output signals in accordance with values placed on predetermined sequences of information items.

10. Apparatus for identifying a plurality of predetermined sequences of information items, comprising: an individual multiposition shift register for receiving each unique information item; means for periodically advancing each said information item from position to position through each said shift register, means connected to each position of each said shift register and responsive to an information item stored therein to provide an output, sensing means connected to said outputs for detecting sequences of information items stored respectively in the positions of said shift registers, and weighing means connected to said sensing means and responsive to said sequences of information items to provide weight output signals in accordance with values placed on predetermined sequences of information items; means adapted to supply fictitious weight signals on all weight output lines which have a weight output less than that carrying the highest values signal, said means comprising a diode chain; and means for suppressing the weight signals on all said weight output lines except the one indicating the most significant weight.

References Cited in the file of this patent

UNITED STATES PATENTS

| | | |
|---|---|---|
| 2,615,992 | Flory | Oct. 28, 1952 |
| 2,682,043 | Fitch | June 22, 1954 |
| 2,733,432 | Breckman | Jan. 31, 1956 |
| 2,821,696 | Shiowitz | Jan. 28, 1958 |